(12) United States Patent
Shysheya et al.

(10) Patent No.: US 11,367,239 B2
(45) Date of Patent: Jun. 21, 2022

(54) TEXTURED NEURAL AVATARS

(71) Applicant: Samsung Electronics Co., Ltd., Suwon-si (KR)

(72) Inventors: Aliaksandra Petrovna Shysheya, Minsk (BY); Kara-Ali Alibulatovich Aliev, Moscow (RU); Renat Maratovich Bashirov, Moscow (RU); Egor Andreevich Burkov, Moscow (RU); Karim Zhamalovich Iskakov, Moscow (RU); Aleksei Aleksandrovich Ivakhnenko, Moscow (RU); Viktor Sergeevich Lempitsky, Moscow (RU); Yury Andreevich Malkov, Moscow (RU); Igor Igorevich Pasechnik, Moscow (RU); Dmitry Vladimirovich Ulyanov, Moscow (RU); Alexander Timurovich Vakhitov, Moscow (RU); Egor Olegovich Zakharov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/284,253

(22) PCT Filed: Nov. 8, 2019

(86) PCT No.: PCT/KR2019/015138
§ 371 (c)(1),
(2) Date: Apr. 9, 2021

(87) PCT Pub. No.: WO2020/096403
PCT Pub. Date: May 14, 2020

(65) Prior Publication Data
US 2021/0358197 A1    Nov. 18, 2021

(30) Foreign Application Priority Data

Nov. 9, 2018 (RU) .......................... RU2018139556
Feb. 21, 2019 (RU) .......................... RU2019104985

(51) Int. Cl.
*G06T 15/04* (2011.01)
*G06N 20/00* (2019.01)
(Continued)

(52) U.S. Cl.
CPC .......... *G06T 15/04* (2013.01); *G06N 3/0454* (2013.01); *G06N 20/00* (2019.01); *G06T 15/205* (2013.01); *G06T 17/10* (2013.01); *G06V 40/103* (2022.01)

(58) Field of Classification Search
CPC ....... G06T 15/04; G06T 15/205; G06T 17/10; G06T 19/00; G06T 7/40; G06T 11/40;
(Continued)

(56) References Cited

U.S. PATENT DOCUMENTS 10,002,460 B2    6/2018   Black et al.
10,417,818 B2 *  9/2019   Loper ..................... G06T 13/40
(Continued)

FOREIGN PATENT DOCUMENTS

EP    2 930 689 B1    12/2017
KR   10-1833364 B1    2/2018
(Continued)

OTHER PUBLICATIONS

S. Suwajanakorn, S. M. Seitz, and I. Kemelmacher-Shlizerman. Synthesizing Obama: learning lip sync from audio. ACM Transactions on Graphics (TOG), 36(4):95, 2017.
(Continued)

*Primary Examiner* — Abderrahim Merouan
(74) *Attorney, Agent, or Firm* — Jefferson IP Law, LLP (57) ABSTRACT

The present invention relates generally to the field of computer vision and computer graphics to produce full body
(Continued)

renderings of a person for varying person pose and camera positions and, in particular, to a system and method for synthesizing 2-D image of a person. The method for synthesizing 2-D image of a person comprises: receiving (S101) 3D coordinates of body joint positions of the person defined in a camera coordinate frame, wherein the 3D coordinates of the body joint positions define a pose of the person and a viewpoint of the 2-D image; predicting (S102), using a trained machine learning predictor, a map stack of body part assignments and a map stack of body part coordinates based on the 3D coordinates of the body joint positions, wherein the map stack of body part coordinates defines texture coordinates of pixels of the body parts of the person, the map stack of body part assignments defines weights, each weight indicating a probability of particular pixel to belong to a particular body part of the person; retrieving (S103), from a memory, a map stack of textures for the body parts of the person previously initialized, wherein the map stack of textures comprises values of the pixels of the body parts of the person; and reconstructing (S104) the 2-D image of the person as a weighted combination of the values of the pixels by using the map stack of body part assignments, the map stack of body part coordinates and the map stack of textures. The system for synthesizing 2-D image of a person implements the method for synthesizing 2-D image of a person.

13 Claims, 4 Drawing Sheets

(51) Int. Cl.
  *G06N 3/04* (2006.01)
  *G06T 15/20* (2011.01)
  *G06T 17/10* (2006.01)
  *G06V 40/10* (2022.01)
(58) Field of Classification Search
  CPC ........ G06T 1/00; G06N 20/00; G06N 3/0454; G06N 3/02; G06V 40/103; H04N 13/275
  See application file for complete search history.

(56) References Cited

U.S. PATENT DOCUMENTS

| | | | |
|---|---|---|---|
| 10,839,586 B1* | 11/2020 | Nemchinov | .......... G06T 3/0037 |
| 2009/0252423 A1 | 10/2009 | Zhu et al. | |
| 2010/0197391 A1 | 8/2010 | Geiss | |
| 2012/0056800 A1 | 3/2012 | Williams et al. | |
| 2012/0169737 A1* | 7/2012 | Alter | ....................... G06T 13/40 |
| | | | 345/428 |
| 2014/0168217 A1 | 6/2014 | Kim et al. | |
| 2015/0116563 A1 | 4/2015 | Herman et al. | |
| 2018/0240281 A1 | 8/2018 | Vincelette | |
| 2021/0049811 A1* | 2/2021 | Fedyukov | ................ G06T 17/00 |
| 2021/0142539 A1* | 5/2021 | Ayush | .................... G06T 3/0093 |
| 2021/0358197 A1* | 11/2021 | Shysheya | .............. G06T 15/205 |

FOREIGN PATENT DOCUMENTS

| | | |
|---|---|---|
| RU | 2 615 911 C1 | 4/2017 |
| WO | 2018/154331 A1 | 8/2018 |

OTHER PUBLICATIONS

J. Taylor, J. Shotton, T. Sharp, and A. Fitzgibbon. The Vitruvian manifold: Inferring dense correspondences for one shot human pose estimation. In Computer Vision and Pattern Recognition (CVPR), 2012 IEEE Conference on, pp. 103-110. IEEE, 2012. 3.

S. Tulyakov, M.-Y. Liu, X. Yang, and J. Kautz. Mocogan: Decomposing motion and content for video generation. In the IEEE Conference on Computer Vision and Pattern Recognition (CVPR), Jun. 2018.

D. Ulyanov, V. Lebedev, A. Vedaldi, and V. S. Lempitsky. Texture networks: Feed-forward synthesis of textures and stylized images. In Proc. ICML, pp. 1349-1357, 2016.

M. Volino, D. Casas, J. P. Collomosse, and A. Hilton. Optimal representation of multi-view video. In Proc. BMVC, 2014.

T.-C. Wang, M.-Y. Liu, J.-Y. Zhu, G. Liu, A. Tao, J. Kautz, and B. Catanzaro. Video-to-video synthesis. arXiv preprint arXiv:1808.06601, 2018.

L. Wei, L. Hu, V. Kim, E. Yumer, and H. Li. Real-time hair rendering using sequential adversarial networks. In the European Conference on Computer Vision (ECCV), Sep. 2018.

A. Weiss, D. Hirshberg, and M. J. Black. Home 3d body scans from noisy image and range data. In Computer Vision (ICCV), 2011 IEEE International Conference on, pp. 1951-1958. IEEE, 2011.

T. Weyrich, W. Matusik, H. Pfister, B. Bickel, C. Donner, C. Tu, J. McAndless, J. Lee, A. Ngan, H. W. Jensen, et al. Analysis of human faces using a measurement-based skin reflectance model. In ACM Transactions on Graphics (TOG), vol. 25, pp. 1013-1024. ACM, 2006.

O. Wiles, A. Sophia Koepke, and A. Zisserman. X2face: A network for controlling face generation using images, audio, and pose codes. In the European Conference on Computer Vision (ECCV), Sep. 2018.

E. Wood, T. Baltrusaitis, X. Zhang, Y. Sugano, P. Robinson, and A. Bulling. Rendering of eyes for eye-shape registration and gaze estimation. In Proceedings of the IEEE International Conference on Computer Vision, pp. 3756-3764, 2015.

F. Xu, Y. Liu, C. Stoll, J. Tompkin, G. Bharaj, Q. Dai, H.-P. Seidel, J. Kautz, and C. Theobalt. Video-based characters: creating new human performances from a multi-view video database. ACM Transactions on Graphics (TOG), 30(4):32, 2011.

Russian Office Action and Search Report dated Sep. 18, 2019, issued in Russian Application No. 2019104985.

Russian Decision to Grant dated Dec. 26, 2019, issued in Russian Application No. 2019104985.

International Search Report and Written Opinion dated Feb. 21, 2020, issued in International Application No. PCT/KR2019/015138.

V. S. Lempitsky and D. V. Ivanov. Seamless mosaicing of image-based texture maps. In 2007 IEEE Computer Society Conference on Computer Vision and Pattern Recognition (CVPR 2007), Jun. 18-23, 2007, Minneapolis, Minnesota, USA, 2007.

T.-Y. Lin, M. Maire, S. Belongie, J. Hays, P. Perona, D. Ramanan, P. Doll'ar, and C. L. Zitnick. Microsoft COCO: Common objects in context. In European conference on computer vision, pp. 740-755. Springer, 2014.

L. Liu,W. Xu, M. Zollhoefer, H. Kim, F. Bernard, M. Habermann, W. Wang, and C. Theobalt. Neural animation and reenactment of human actor videos. arXiv preprint arXiv:1809.03658, 2018.

S. Lombardi, J. Saragih, T. Simon, and Y. Sheikh. Deep appearance models for face rendering. ACM Transactions on Graphics (TOG), 37(4):68, 2018.

M. Loper, N. Mahmood, J. Romero, G. Pons-Moll, and M. J. Black. Smpl: A skinned multi-person linear model. ACM Transactions on Graphics (TOG), 34(6):248, 2015.

M. Mori. The uncanny valley. Energy, 7(4):33-35, 1970.

F. Mueller, F. Bernard, O. Sotnychenko, D. Mehta, S. Sridhar, D. Casas, and C. Theobalt. Ganerated hands for realtime 3d hand tracking from monocular rgb. In the IEEE Conference on Computer Vision and Pattern Recognition (CVPR), Jun. 2018.

N. Neverova, R. A. Guler, and I. Kokkinos. Dense pose transfer. In the European Conference on Computer Vision (ECCV), Sep. 2018.

G. Pavlakos, L. Zhu, X. Zhou, and K. Daniilidis. Learning to estimate 3d human pose and shape from a single color image. In the IEEE Conference on Computer Vision and Pattern Recognition (CVPR), Jun. 2018.

G. Pons-Moll, J. Romero, N. Mahmood, and M. J. Black. Dyna: A model of dynamic human shape in motion. ACM Transactions on Graphics (TOG), 34(4):120, 2015.

(56) References Cited

OTHER PUBLICATIONS

A. Rav-Acha, P. Kohli, C. Rother, and A.W. Fitzgibbon. Unwrap mosaics: a new representation for video editing. ACM Trans. Graph., 27(3):17:1-17:11, 2008. 3.
N. Robertini, D. Casas, E. De Aguiar, and C. Theobalt. Multi-view performance capture of surface details. International Journal of Computer Vision, 124(1):96-113, 2017.
Z. Shu, M. Sahasrabudhe, R. Alp Guler, D. Samaras, N. Paragios, and I. Kokkinos. Deforming autoencoders: Unsupervised disentangling of shape and appearance. In the European Conference on Computer Vision (ECCV), Sep. 2018.
A. Siarohin, E. Sangineto, S. Lathuilire, and N. Sebe. Deformable gans for pose-based human image generation. In the IEEE Conference on Computer Vision and Pattern Recognition (CVPR), Jun. 2018.
J. Starck and A. Hilton. Model-based multiple view reconstruction of people. In IEEE International Conference on Computer Vision (ICCV), pp. 915-922, 2003.
I. Stavness, C. A. S'anchez, J. Lloyd, A. Ho, J.Wang, S. Fels, and D. Huang. Unified skinning of rigid and deformable models for anatomical simulations. In SIGGRAPH Asia 2014 Technical Briefs, p. 9. ACM, 2014.
D. Sungatullina, E. Zakharov, D. Ulyanov, and V. Lempitsky. Image manipulation with perceptual discriminators. In the European Conference on Computer Vision (ECCV), Sep. 2018.
Thu Nguyen-Phuoc et al., RenderNet: A deep convolutional network for differentiable rendering from 3D shapes, arXiv.org 2018, Jun. 19, 2018.
Roland Kehl et al., Markerless tracking of complex human motions from multiple views, Computer Vision and Image Understanding, vol. 104, Issues 2-3, Nov.-Dec. 2006, pp. 190-209 [found on Sep. 9, 2019].
Hilton, A. et al., Whole-body modelling of people from multi-view images to populate virtual worlds, International Journal of Computer Graphics The Visual Computer, vol. 16, Issue 7, Nov. 2000, pp. 411-436, [found on Sep. 9, 2019].
Kfir Aberman et al., "Deep Video-Based Performance Cloning", arXiv preprint arXiv:1808.06847, Aug. 21, 2018.
Thiemo Alldieck et al., "Detailed Human Avatars from Monocular Video", In 2018 International Conference on 3D Vision (3DV), pp. 98-109, IEEE, Aug. 3, 2018.
Thiemo Alldieck et al. "Video Based Reconstruction of 3D People Models", In the IEEE Conference on Computer Vision and Pattern Recognition (CVPR), Jun. 2018.
Alexandru O. Balan et al. "The naked truth: Estimating body shape under clothing", In European Conference on Computer Vision, pp. 15-29, Springer, 2008.
Federica Bogo et al.,"Detailed Full-Body Reconstructions of Moving People from Monocular RGB-D Sequences", In Proceedings of the IEEE International Conference on Computer Vision, pp. 2300-2308, 2015.
Federica Bogo et al., "Keep it SMPL: Automatic Estimation of 3D Human Pose and Shape from a Single Image", In European Conference on Computer Vision, pp. 561-578, Springer, 2016.
Jie Cao et al., "Learning a High Fidelity Pose Invariant Model for High-resolution Face Frontalization", arXiv preprint arXiv:1806.08472, Jun. 22, 2018.
Dan Casas et al., "4D Video Textures for Interactive Character Appearance", Centre for Vision, Speech & Signal Processing, University of Surrey, United Kingdom, In Computer Graphics Forum, vol. 33, pp. 371-380, Wiley Online Library, 2014.
Caroline Chan et al., "Everybody Dance Now", arXiv preprint arXiv:1808.07371, Aug. 22, 2018.
Qifeng Chen et al., "Photographic Image Synthesis with Cascaded Refinement Networks", In IEEE International Conference on Computer Vision, ICCV 2017, Venice, Italy, Oct. 22-29, 2017, pp. 1520-1529, 2017.

Yunjey Choi et al., "StarGAN: Unified Generative Adversarial Networks for Multi-Domain Image-to-Image Translation", In the IEEE Conference on Computer Vision and Pattern Recognition (CVPR), Jun. 2018.
Alvaro Collet et al., "High-Quality Streamable Free-Viewpoint Video", ACM Transactions on Graphics (TOG), 34(4):69, 2015.
Craig Donner et al., "A Layered, Heterogeneous Reflectance Model for Acquiring and Rendering Human Skin", In ACM Transactions on Graphics (TOG), vol. 27, p. 140. ACM, 2008.
Alexey Dosovitskiy et al., "Generating Images with Perceptual Similarity Metrics based on Deep Networks", In Proc. NIPS, pp. 658-666, 2016.
Alexey Dosovitskiy et al., "Learning to generate chairs with convolutional neural networks", In Proceedings of the IEEE Conference on Computer Vision and Pattern Recognition, pp. 1538-1546, 2015.
Mingsong Dou et al. "Motion2Fusion: Real-time Volumetric Performance Capture", ACM Transactions on Graphics (TOG), 36(6):246, 2017.
Andrew Feng et al., "Avatar Reshaping and Automatic Rigging Using a Deformable Model", In Proceedings of the 8th ACM SIGGRAPH Conference on Motion in Games, pp. 57-64. ACM, 2015.
Yaroslav Ganin et al., "DeepWarp: Photorealistic Image Resynthesis for Gaze Manipulation", Skolkovo Institute of Science and Technology, In European Conference on Computer Vision, pp. 311-326, Springer, 2016.
Bastian Goldluecke et al., "Superresolution Texture Maps for Multiview Reconstruction", In IEEE 12th International Conference on Computer Vision, ICCV 2009, Kyoto, Japan, Sep. 27-Oct. 4, 2009, pp. 1677-1684, 2009.
Ian J. Goodfellow et al., "Generative Adversarial Nets", In Advances in neural information processing systems, pp. 2672-2680, 2014.
Riza Alp Guler et al., "DensePose: Dense Human Pose Estimation In The Wild", In the IEEE Conference on Computer Vision and Pattern Recognition (CVPR), Jun. 2018.
Riza Alp Guler et al., "DenseReg: Fully Convolutional Dense Shape Regression In-the-Wild", In CVPR, vol. 2, p. 5, 2017.3.
Nils Hasler et al.,"Multilinear Pose and Body Shape Estimation of Dressed Subjects from Image Sets", In Computer Vision and Pattern Recognition (CVPR), 2010 IEEE Conference on, pp. 1823-1830, IEEE, 2010.
Phillip Isola et al., "Image-to-Image Translation with Conditional Adversarial Networks", In Proc. CVPR, pp. 5967-5976, 2017.
Max Jaderberg et al., "Spatial Transformer Networks", In Proc. NIPS, pp. 2017-2025, 2015.
Justin Johnson et al., "Perceptual Losses for Real-Time Style Transfer and Super-Resolution", In Proc. ECCV, pp. 694-711, Mar. 27, 2016.
Angjoo Kanazawa et al., "End-to-end Recovery of Human Shape and Pose", In the IEEE Conference on Computer Vision and Pattern Recognition (CVPR), Jun. 23, 2018.
Tero Karras et al., "Progressive Growing of GANS for Improved Quality, Stability, and Variation", In International Conference on Learning Representations, Feb. 26, 2018.
Hyeongwoo Kim et al., "Deep Video Portraits", arXiv preprint arXiv:1805.11714, May 29, 2018.
Oliver Klehm et al., "Recent Advances in Facial Appearance Capture", In Computer Graphics Forum, vol. 34, pp. 709-733, Wiley Online Library, 2015.
Aliaksandra Shysheya et al., Textured Neural Avatars, 2019 IEEE/CVF Conference on Computer Vision and Pattern Recognition (CVPR), IEEE, Jun. 15, 2019, pp. 2382-2392, XP 033687572.
Egor Zakharov et al., Textured Neural Avatars, arXiv:1905.08776v1, May 21, 2019, pp. 1-12, XP 055731671.
Jamie Shotton et al., Real-Time Human Pose Recognition in Parts from Single Depth Images, Jan. 1, 2013, pp. 116-124, XP058010058.
European Search Report dated Oct. 21, 2021, issued in European Application No. 19882209.0.

\* cited by examiner

TEXTURED NEURAL AVATARS

TECHNICAL FIELD

The present invention relates generally to the field of computer vision and computer graphics to produce full body renderings of a person for varying person pose and camera positions and, in particular, to a system and method for synthesizing 2-D images of a person or 3-D images of a person.

BACKGROUND ART

Capturing and rendering human body in all of its complexity under varying pose and imaging conditions is one of the core problems of computer vision and computer graphics. Recently, there is a surge of interest that involves deep ConvNets (Convolutional Networks) as an alternative to classical graphics pipelines. Realistic neural rendering of body fragments e.g. faces [48, 34, 29], eyes [18], hands [37] etc. is now possible. Very recent works have shown abilities of such networks to generate views of a person with a varying pose but with fixed camera position and tight clothing [1, 9, 33, 53].

Being at the intersection of several research areas, the present invention is closely related to a very large number of previous works, and below some of these connections are discussed.

Geometric human body modeling. Building full-body avatars from image data has long been one of the main topics of the computer vision research. Traditionally, an avatar is defined by a 3D geometric mesh of a certain neutral pose, a texture, and a skinning mechanism that transform the mesh vertices according to pose changes. A large group of works has been devoted to body modeling from 3D scanners [40], registered multiview sequences [42] as well as from depth and RGB-D sequences [5, 55]. On the other extreme are methods that fit skinned parametric body models to single images [45, 4, 23, 6, 27, 39]. Finally, research on building full-body avatars from monocular videos has started [3, 2]. Similarly to the last group of works, the present invention builds an avatar from a video or a set of unregistered monocular videos. The classical (computer graphics) approach to modeling human avatars requires explicit physically-plausible modeling of human skin, hair, sclera, clothing surface reflectivity, as well as explicit physically-plausible modeling of motion under pose changes. Despite considerable progress in reflectivity modeling [56, 13, 30, 58] and better skinning/dynamic surface modeling [46, 17, 35], the computer graphics approach still requires considerable "manual" effort of designers to achieve high realism and to pass the so-called uncanny valley [36], especially if real-time rendering of avatars is required.

Neural human body modeling. Image synthesis using deep convolutional neural networks is a thriving area of research [20, 15] and a lot of recent effort has been directed onto synthesis of realistic human faces [28, 11, 47]. Compared to traditional computer graphics representations, deep ConvNets model data by fitting an excessive number of learnable weights to training data. Such ConvNets avoid explicit modeling of the surface geometry, surface reflectivity, or surface motion under pose changes, and therefore do not suffer from the lack of realism of the corresponding components. On the flipside, the lack of ingrained geometric or photometric models in this approach means that generalizing to new poses and in particular to new camera views may be problematic. Still a lot of progress has been made over the last several years for the neural modeling of personalized talking head models [48, 29, 34], hair [54], hands [37]. Over the last several months, several groups have presented results of neural modeling of full bodies [1, 9, 53, 33]. While the presented results are very impressive, they still confine the training and the test image correspond to the same camera view, which in our experience makes the task considerably simpler than modeling body appearance from arbitrary viewpoint. In the present invention, the aim is to expand the neural body modeling approach to tackle the latter, harder task.

Models with neural warping. A number of recent works warp a photo of a person to a new photorealistic image with modified gaze direction [18], modified facial expression/pose [7, 50, 57, 43], or modified body pose [50, 44, 38], whereas the warping field is estimated using a deep convolutional network (while the original photo serves as a special kind of texture). These approaches are however limited in their realism and/or the amount of change they can model, due to their reliance on a single photo of a given person for its input. An approach of the present invention also disentangles texture from surface geometry/motion modeling but trains from videos, therefore being able to handle harder problem (full body multiview setting) and to achieve higher realism.

Dense pose and related approaches. The system of the present invention relies on the body surface parameterization (UV parameterization) similar to the one used in the classical graphics-based representation. Part of our system performs a mapping from the body pose to the surface parameters (UV coordinates) of image pixels. This provides the approach of the present invention related to the Dense-Pose approach [21] and the earlier works [49, 22] that predict UV coordinates of image pixels from the input photograph. Furthermore, the approach of the present invention uses DensePose results for pretraining.

Texture-based representation of multi-view data. The system of the present invention is also related to approaches that extract textures from multi-view image collections [31, 19] or multi-view video collections [52] or a single video [41]. The approach of the present invention is also related to free-viewpoint video compression and rendering systems, e.g. [52, 8, 12, 16]. Unlike those works, the approach of the present invention is restricted to scenes containing a single human. At the same time, the approach of the present invention aims to generalize not only to new camera views but also to new user poses unseen in the training videos. The work of [59] is the most related to ours in this group, as they warp the individual frames of the multiview video dataset according to the target pose to generate new sequences. The poses that they can handle, however, are limited by the need to have a close match in the training set, which is a strong limitation given the combinatorial nature of the human pose configuration space.

DISCLOSURE OF INVENTION

Technical Problem

The purpose of the present invention is to provide a system and method for synthesizing 2-D images of a person or 3-D images of a person.

Solution to Problem

An aspect of the present invention provides a method for synthesizing 3-D images of a person, the method comprising: receiving an image of 3D joint positions of the person, the image defined in a camera coordinate frame; generating a map stack of rasterized segments based on the image of 3D joint positions of the person, wherein each map of the map stack comprises a rasterized segment representing a body part of the person and the map stack of rasterized segments incorporates the information about the person and the camera pose; predicting, in a trained network, a map stack of body part assignments and a map stack of body part coordinates from the map stack of rasterized segments, wherein each map of body part coordinates correspond to pixel coordinates on the body part, the map stack of body part assignments and the map stack of body part coordinates defines weights and texture coordinates; and reconstructing, in a trained network, 3-D image of a person at each pixel as a weighted combination of texture elements by using a map stack of body part assignments, a map stack of body part coordinates and texture maps obtained during training the network.

Other aspect of the present invention provides a system for synthesizing 3-D images of a person, the system comprising: a processor; and a memory comprising instructions causing the processor to: receive an image of 3D joint positions of the person, the image defined in a camera coordinate frame; generate a map stack of rasterized segments based on the image of 3D joint positions of the person, wherein each map of the map stack comprises a rasterized segment representing a body part of the person and the map stack of rasterized segments incorporates the information about the person and the camera pose; predict, in a trained network, a map stack of body part assignments and a map stack of body part coordinates from the map stack of rasterized segments, wherein each map of body part coordinates correspond to pixel coordinates on the body part, the map stack of body part assignments and the map stack of body part coordinates defines weights and texture coordinates; reconstruct, in a trained network, 3-D image of a person at each pixel as a weighted combination of texture elements by using a map stack of body part assignments, a map stack of body part coordinates and texture maps obtained during training the network.

An aspect of the present invention provides a method for synthesizing 2-D image of a person, the method comprising: receiving (S101) 3D coordinates of body joint positions of the person defined in a camera coordinate frame, wherein the 3D coordinates of the body joint positions define a pose of the person and a viewpoint of the 2-D image; predicting (S102), using a trained machine learning predictor, a map stack of body part assignments and a map stack of body part coordinates based on the 3D coordinates of the body joint positions, wherein the map stack of body part coordinates defines texture coordinates of pixels of the body parts of the person, the map stack of body part assignments defines weights, each weight indicating a probability of particular pixel to belong to a particular body part of the person; retrieving (S103), from a memory, a map stack of textures for the body parts of the person previously initialized, wherein the map stack of textures comprises values of the pixels of the body parts of the person; reconstructing (S104) the 2-D image of the person as a weighted combination of the values of the pixels by using the map stack of body part assignments, the map stack of body part coordinates and the map stack of textures.

In additional aspect, obtaining the trained machine learning predictor and the map stack of textures for the body parts of the person previously initialized comprises: receiving (S201) a plurality of images of the person in different poses and from different viewpoints; obtaining (S202) the 3D coordinates of body joint positions of the person defined in the camera coordinate frame for each image of the received plurality of images; initializing (S203) the machine learning predictor based on the 3D coordinates of the body joint positions and the received plurality of images to obtain parameters for predicting the map stack of body part assignments and the map stack of body part coordinates; initializing (S204) the map stack of textures based on the 3D coordinates of the body joint positions and the received plurality of images and storing, in the memory, the map stack of the textures; predicting (S205), using the current state of the machine learning predictor, the map stack of body part assignments and the map stack of body part coordinates based on the 3D coordinates of the body joint positions; reconstructing (S206) 2-D image of the person as a weighted combination of the values of the pixels by using the map stack of body part assignments, the map stack of body part coordinates and the map stack of textures stored in the memory; comparing (S207) reconstructed 2-D image with corresponding ground truth 2-D image from within the received plurality of images to reveal an error of reconstructing the 2-D image; updating (S208) the parameters of the trained machine learning predictor and the values of the pixels in the map stack of textures based on the result of the comparison; and repeating steps S205 to S208 for reconstructing different 2-D images of the person until a predetermined condition is met, wherein the predetermined condition is at least one of performing a predetermined number of repetitions, expiration of a predetermined time or the error of reconstructing the 2-D image of the person does not reduce.

In another additional aspect, the machine learning predictor is one of a deep neural network, a deep convolutional neural network, a deep fully-convolutional neural network, a deep neural network trained with a perceptual loss function, a deep neural network trained in an generative adversarial framework.

In another additional aspect, the method further comprises: generating a map stack of rasterized segments based on the 3D coordinates of the body joint positions, wherein each map of the map stack of rasterized segments comprises a rasterized segment representing the body part of the person, wherein the predicting the map stack of body part assignments and the map stack of body part coordinates is based on the map stack of rasterized segments.

In another additional aspect, the trained machine learning predictor is retrained for another person based on a plurality of images of another person.

Other aspect of the present invention provides a system for synthesizing 2-D image of a person, the system comprising: a processor; and a memory comprising instructions causing the processor to implement the method for synthesizing 2-D image of a person.

Advantageous Effects of Invention

The present invention allows to achieve the following advantages:
better generalization compared to systems that use direct convolutional mappings between joint positions and pixel values;
highly realistic renderings;
improved realism of generated images;
easier estimation of motion capture data;
faster training time in comparison to the direct translation approach.

BRIEF DESCRIPTION OF DRAWINGS

The above and other aspects, features, and advantages of the present invention will be more apparent from the following detailed description taken in conjunction with the accompanying drawings, in which.

In the following description, unless otherwise described, the same reference numerals are used for the same elements when they are depicted in different drawings, and overlapping description thereof will be omitted.

BEST MODE FOR CARRYING OUT THE INVENTION

Mode for the Invention

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only.

It is to be understood that the singular forms "a," "an," and "the" include plural referents unless the context clearly dictates otherwise. Thus, for example, reference to "an eye region" includes reference to one or more of such images.

It will be understood that, although the terms first, second, etc. may be used herein in reference to elements of the present disclosure, such elements should not be construed as limited by these terms. The terms are used only to distinguish one element from other elements.

It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In various embodiments of the present disclosure, "module" or "unit" may perform at least one function or operation, and may be implemented with hardware, software, or a combination thereof. "Plurality of modules" or "plurality of units" may be implemented with at least one processor (not shown) through integration thereof with at least one module other than "module" or "unit" which needs to be implemented with specific hardware.

A system for learning full body neural avatars is provided. The system trains a deep network to produce full body renderings of a person for varying person pose and camera positions. In the training process, the system explicitly estimates the 2D texture describing the appearance of the body surface. While retaining explicit texture estimation, the system bypasses the explicit estimation of 3D skin (surface) geometry at any time. Instead, at test time, the system directly maps the configuration of body feature points w.r.t. the camera to the 2D texture coordinates of individual pixels in the image frame. The system is capable of learning to generate highly realistic renderings while being trained on monocular videos. Maintaining an explicit texture representation within an architecture of the present invention helps it to achieve better generalization compared to systems that use direct convolutional mappings between joint positions and pixel values.

The present invention demonstrates how modern generative neural networks can be used to synthesize free viewpoint full-body videos of humans. A neural avatar is built that is controlled by the 3D positions of human joints, can synthesize the image for an arbitrary camera, and trains from a set of unregistered monocular videos (or even a single long video).

Figure 1:
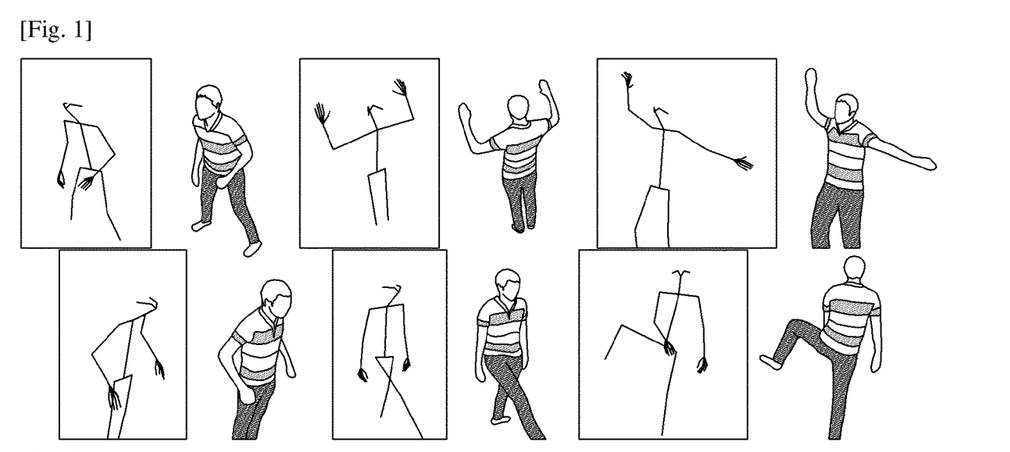
FIG. 1 shows textured neural avatar results (without video-to-video post-processing) for viewpoints unseen during training.

For the purpose of the present invention, a (full-body) avatar is defined as a system that is capable of rendering views of a certain person under varying human pose defined by a set of 3D positions of the body joints and varying camera positions (FIG. 1). FIG. 1 shows textured neural avatar results (without video-to-video post-processing) for viewpoints unseen during training. The images on the left are obtained by processing the pose input shown on the right. Body joint positions are taken rather than joint angles as an input, since such positions are easier to estimate from data using marker-based or marker-less motion capture systems. A classical ("neural-free") avatar based on a standard computer graphics pipeline is to take a user-personalized body mesh in a neutral position, estimate the joint angles from the joint positions, perform skinning (deformation of the neutral pose) thus estimating the 3D geometry of the body. After that texture mapping is applied using precomputed 2D texture. Finally, the resulting textured model is lit using a certain lighting model and then projected onto the camera view. Creating a person's avatar in the classical pipeline thus requires personalizing the skinning process responsible for the geometry and the texture that is responsible for appearance.

Emerging avatar systems based on deep convolutional networks (neural avatars) attempt to shortcut the multiple stages of the classical pipeline and to replace them with a single network that learns the mapping from the input (the location of body joints) to the output (the 2D image). To simplify the learning task, the input representation can be augmented with additional images such as the results of the classical pipeline in [29, 33] or a dense pose [21] representation in [53]. The abundance of learnable parameters, the ability to learn from long videos, and the flexibility of ConvNets allows neural avatars to model the appearance of parts that are very challenging for a classical pipeline, such as hair, skin, complex clothing and glasses, etc. In addition, the conceptual simplicity of such "black-box" approach is appealing. At the same time, while it is easy to fit ConvNets to training data, the lack of in-built model-specific invariances and the conflation of shape and appearance estimation limits the generalization abilities of such systems. As a result, previous neural rendering approaches are confined to either subpart of the body (up to head-and-shoulders [29]) and/or to a particular camera view [1, 9, 53, 33].

Figure 2:
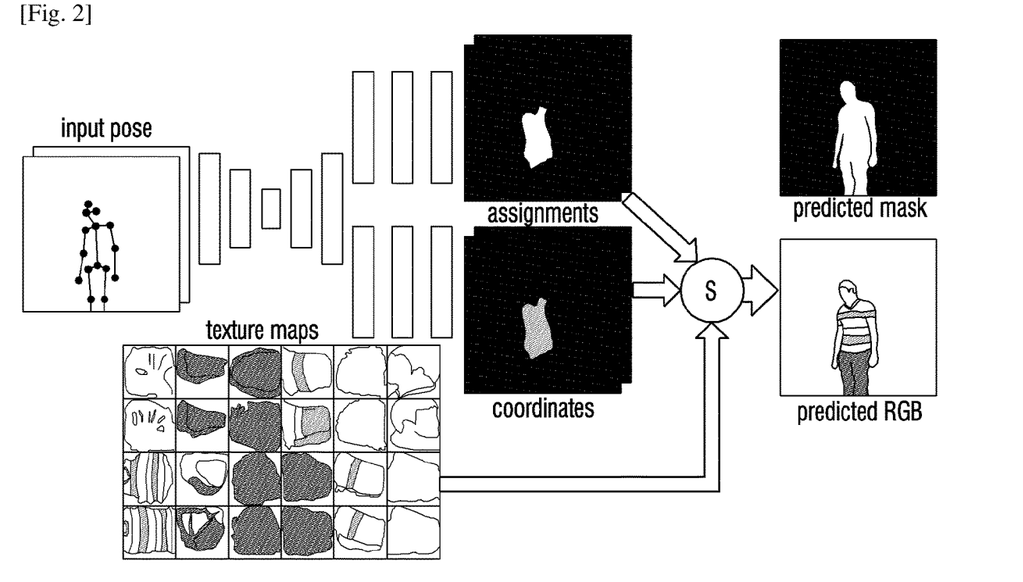
FIG. 2 is the overview of the textured neural avatar system.

The system of the present invention does full body rendering and combines the ideas from the classical computer graphics, namely the decoupling of geometry and texture, with the use of deep convolutional neural networks. In particular, similarly to the classic pipeline, the system explicitly estimates the 2D textures of body parts. The 2D texture within the classical pipeline effectively transfers the appearance of the body fragments across camera transformations and body articulations. Keeping this component with the neural pipeline thus boosts generalization across such transforms. The role of the convolutional network in the approach of the present invention is then confined to predicting the texture coordinates of individual pixels given the body pose and the camera parameters (FIG. 2). Additionally, the network predicts the foreground/background mask.

Comparison of the performance of the textured neural avatar provided by the present invention with direct video-to-video translation approach [53] shows that explicit estimation of textures brings additional generalization capability and considerably improves the realism of the generated images for new views. Significant benefits provided by the present invention consist in the fact that the explicit decoupling of textures and geometry gives in the transfer learning scenarios, when the network is retrained to a new person with little training data. Finally, the textured neural avatar enjoys considerably faster training time than the direct translation approach.

Methods

Notation. The lower index i is used to denote objects that are specific to the i-th training or test image. Uppercase notation is used, e.g. $B_i$ denotes a stack of maps (a third order tensor/three-dimensional array) corresponding to the i-th training or test image. The upper index is used to denote a specific map (channel) in the stack, e.g. $B^j_i$. Furthermore, square brackets is used to denote elements corresponding to a specific image location, e.g. $B^j_i[x;y]$ denotes the scalar element in the j-th map of the stack $B_i$ located at location (x;y), and $B_i[x;y]$ denotes the vector of elements corresponding to all maps sampled at location (x;y).

Input and output. In general, synthesizing images of a certain person given its pose is required. It is assumed that the pose for the i-th image comes in the form of 3D joint positions defined in the camera coordinate frame. As an input to the network, then consider a map stack $B_i$ is considered, where each map $B^j_i$ contains the rasterized j-th segment (bone) of the "stickman" (skeleton) projected on the camera plane. To retain the information about the third coordinate of the joints, the depth-value is linearly interpolated between the joints defining the segments, and the interpolated values are used to define the values in the map $B^j_i$ corresponding to the bone pixels (the pixels not covered by the j-th bone are set to zero). Overall, the stack $B_i$ incorporates the information about the person and the camera pose.

As an output, the network is used to produce an RGB image (a three-channel stack) $I_i$ and a single channel mask $M_i$ defining the pixels that are covered by the avatar. At training time, it is assumed that for each input frame i, the input joint locations and the "ground truth" foreground mask are estimated, and 3D body pose estimation and human semantic segmentation are used to extract them from raw video frames. At test time, given a real or synthetic background image $\hat{I}_i$, the final view is generated by first predicting $M_i$ and $I_i$ from the body pose and then linearly blending the resulting avatar into an image: $\hat{I}=I_i \odot M_i + \hat{I}_i \odot (1-M_i)$ (where $\odot$ defines a "location-wise" product, where the RGB values at each location are multiplied by the mask value at this location).

Direct translation. The direct approach that is considered as a baseline to the present invention is to learn an image translation network that maps the map stack $B^k_i$ to the map stacks $I_i$ and $M_i$ (usually the two output stacks are produced within two branches that share the initial stage of the processing [15]).

Generally, mappings between stacks of maps can be implemented using fully-convolutional architectures. Exact architectures and losses for such networks is an active area of research [14, 51, 26, 24, 10]. Very recent works [1, 9, 53, 33] have used direct translation (with various modifications) to synthesize the view of a person for a fixed camera. In particular, the video-to-video system [53] considers the translation network that generates the next frame of the video by taking the inputs for the last three frames, while also considering the output produced by the system for two preceding frames in an auto-regressive fashion. In our case, the video-to-video system [53] is modified to produce the image and the mask:

$$\{I'_i, M'_i\} = h^{v2v}_\Psi(B_i, B_{i-1}, I'_{i-1}, M'_{i-1}, B_{i-2}, I'_{i-2}, M'_{i-2}), \quad (1)$$

Here, $h^{v2v}_\Psi$ is the video-to-video regression network with learnable parameters $\Psi$. It is also assumed that the training or test examples i-1 and i-2 correspond to the preceding frames. The resulting video-to-video translation system provides a strong baseline for the present invention.

Textured neural avatar. The direct translation approach relies on the generalization ability of ConvNets and incorporates very little domain-specific knowledge into the system. As an alternative, the textured avatar approach is applied, that explicitly estimates the textures of body parts, thus ensuring the similarity of the body surface appearance under varying pose and cameras. Following the DensePose approach [21], the body is subdivided into n parts, where each part has a 2D parameterization. Thus, it is assumed that in a person's image each pixel belongs to one of n parts or to the background. In the former case, the pixel is further associated with 2D part specific coordinates. The k-th body part is also associated with the texture map $T^k$ that is estimated during training. The estimated textures are learned at training time and are reused for all camera views and all poses.

The introduction of the body surface parameterization outlined above changes the translation problem. For a given pose defined by $B_i$, the translation network now has to predict the stack $P_i$ of body part assignments and the stack $C_i$ of body part coordinates, where $P_i$ contains n+1 maps of non-negative numbers that sum to identity $$\left( \text{i.e. } \sum_{k=1}^{n} P^k[x,y] = 1 \right),$$

and $C_i$ contains 2n maps of real numbers between 0 and w, where w is the spatial size (width and height) of the texture maps $T^k$.

The map channel $P^k_i$ for k=0 ... n−1 is then interpreted as the probability of the pixel to belong to the k-th body part, and the map channel $P^n_i$ corresponds to the probability of the background. The coordinate maps $C_i^{2k}$ and $C_i^{2k+1}$ correspond to the pixel coordinates on the k-th body part. Specifically, once the part assignments $P_i$ and body part coordinates $C_i$ are predicted, the image $I_i$ at each pixel (x,y) are reconstructed as a weighted combination of texture elements, where the weights and texture coordinates are prescribed by the part assignment maps and the coordinate maps correspondingly:

$$s(P_i, C_i, T)[x, y] = \sum_{k=0}^{n-1} P_i^k[x, y] \boxdot T^k[C_i^{2k}[x, y], C_i^{2k+1}[x, y]], \quad (2)$$

where s(•,•,•) is the sampling function (layer) that outputs the RGB map stack given the three input arguments. In (2), the texture maps $T^k$ are sampled at non-integer locations ($C_i^{2k}[x,y], C_i^{2k+1}[x,y]$) in a bilinear way, so that is computed as:

$$T^k[x,y]=(1-\alpha)(1-\beta)T^k[*x+,*y+]+(1-\alpha)\beta T^k[*x*+,(y)]+ \\ \alpha(1-\beta)T^k[(x),*y+]+\alpha\beta T^{k*}[(x),(y)], \quad (3)$$

for $\alpha$=x−*x+, $\beta$=y−*y+ as suggested in (25).

When training the neural textured avatar, a convolutional network $g_\phi$ is learned with learnable parameters $\phi$ to translate the input map stacks $B_i$ into the body part assignments and the body part coordinates. As $g_\phi$ has two branches ("heads"), $g_\phi^P$ is the branch that produces the body part assignments stack, and $g_\phi^C$ is the branch that produces the body part coordinates. To learn the parameters of the textured neural avatar, the loss between the generated image and the ground truth image $\bar{I}_i$ is optimized:

$$L_{image}(\phi,T)=d(\bar{I}_i,s(g_\phi^P(B_i),g_\phi^C(B_i),T) \quad (4)$$

where d(•,•) is a loss comparing two images (the exact choice is discussed below). During the stochastic optimization, the gradient of the loss (4) is backpropagated through (2) both into the translation network $g_\phi$ and onto the texture maps $T^k$, so that minimizing this loss updates not only the network parameters but also the textures themselves. As an addition, the learning also optimizes the mask loss that measures the discrepancy between the ground truth background mask 1−$\bar{M}_i$ and the background mask prediction:

$$L_{mask}(\phi,T)=d_{BCE}(\bar{I}-M_i,g_\phi^P(B_i)^n), \quad (5)$$

where $d_{BCE}$ is the binary cross-entropy loss, and $g_\phi^P(B_i)^n$ (corresponds to the n-th (i.e. background) channel of the predicted part assignment map stack. After back-propagation of the weighted combination of (4) and (5), the network parameters $\phi$ and the textures maps $T^k$ are updated. As the training progresses, the texture maps change (FIG. 2), and so does the body part coordinate predictions, so that the learning is free to choose the appropriate parameterization of body part surfaces.

FIG. 2 is the overview of the textured neural avatar system. The input pose is defined as a stack of "bone" rasterizations (one bone per channel; here we show it highlighted in red). The input is processed by the fully-convolutional network (orange) to produce body part assignment map stack and the body part coordinate map stack. These stacks are then used to sample the body texture maps at the locations prescribed by the part coordinate stack with the weights prescribed by the part assignment stack to produce the RGB image. In addition, the last body assignment stack map corresponds to the background probability. During learning, the mask and the RGB image are compared with ground-truth and the resulting losses are back-propagated through the sampling operation into the fully-convolutional network and onto the texture, resulting in their updates.

Video-to-video post-processing. While the textured neural avatar model can be used as a standalone neural rendering engine, its output is post-processed with a video-to-video processing module that improves temporal consistency and adds pose- and view-dependent appearance variations that cannot be fully modeled using the textured neural avatar. Thus, the video translation network $h_\Psi^{post}$ with learnable parameters $\Psi$ is considered that takes the stream of outputs of the textured neural avatar as inputs:

$$\{I'_i,M'_i\}=h_\Psi^{post}(B_i,I_i^{TA},B_{i-1},I_{i-1}^{TA},I'_{i-1},M'_{i-1}, \\ B_{i-2},I_{i-2}^{TA},I'_{i-2},M'_{i-2}), \quad (6)$$

Here, we denote with $I_t^{TA}=s(g_\phi^P)(B_t),g_\phi^C(B_t),T)$; the output of the textured neural avatar at time t (It is again assumed that the examples i−1 and i−2 correspond to the preceding frames). Below, our full model, i.e. textured neural avatar with post-processing (6), the textured neural avatars without such post-processing, and the baseline video-to-video model (1) showing the clear improvement from the use of the textured neural avatar (with or without post-processing) are compared.

Initialization of textured neural avatar. The DensePose system [21] is used to initialize the textured neural avatar. Specifically, there are two variants to initialize $g_\phi$. First, when the training data are abundant and come from multiple training monocular sequences, the DensePose can be run on the training images obtaining part assignment maps and part coordinate maps. Then, $g_\phi$ is pretrained as a translation network between the pose stacks $B_i$ and the DensePose outputs. Alternatively, a "uni-versally" pretrained $g_\phi$ can be used that is trained to translate pose stacks into DensePose outputs on a standalone large-scale dataset (we use the COCO dataset [32]).

Once the DensePose mapping has been initialized, the texture maps $T^k$ are initialized as follows. Each pixel in the training images is assigned to a single body part (according to the prediction of $g_\phi^P$) and to a particular texture pixel on the texture of the corresponding part (according to the prediction of $g_\phi^C$). Then, the value of each texture pixel is initialized to the mean of all image values assigned to it (the texture pixels assigned zero pixels are initialized to black).

Losses and architectures. Perceptual (VGG) loss [51, 26] is used in (4) to measure the disparity between the generated and the ground truth image when training the textured neural avatar. Any other standard losses for measuring such disparities can be used.

Transfer learning. Once textured neural avatar is trained for a certain person based on a large amount of data, it can be retrained for a different person using much less data (so-called transfer learning). During retraining a new stack of texture maps is reestimated using the initialization procedure discussed above. After which the training process proceeds in a standard way but using the previously trained set of parameters $\phi$ as initialization.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that embodiments of the system for synthesizing 3-D images of a person can be implemented as different functional units, circuitry and/or processors. However, it will be apparent that any suitable distribution of functionality between different functional units, circuitry and/or processors may be used without detracting from the embodiments.

The embodiments may be implemented in any suitable form including hardware, software, firmware or any combination of these. The embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

The foregoing descriptions of the embodiments of the invention are illustrative, and modifications in configuration and implementation are within the scope of the current description. For instance, while the embodiments of the invention are generally described with relation to FIGS. 1-2, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. Also, the invention is not limited by the illustrated order of the method steps, the order may be modified by a skilled person without creative efforts. Some or all of the method steps may be performed sequentially or concurrently. The scope of the embodiment of the invention is accordingly intended to be limited only by the following claims.

A system for learning full body neural avatars is provided. The system trains a deep network to produce full body renderings of a person for varying person pose and camera positions. The deep network is any one of deep neural network, a deep convolutional neural network, deep fully-convolutional neural network, deep neural network trained with perceptual loss function, a deep neural network trained in an the generative adversarial framework. In the training process, the system explicitly estimates the 2D texture describing the appearance of the body surface. While retaining explicit texture estimation, the system bypasses the explicit estimation of 3D skin (surface) geometry at any time. Instead, at test time, the system directly maps the configuration of body feature points w.r.t. the camera to the 2D texture coordinates of individual pixels in the image frame. The system is capable of learning to generate highly realistic renderings while being trained on monocular videos. Maintaining an explicit texture representation within an architecture of the present invention helps it to achieve better generalization compared to systems that use direct convolutional mappings between joint positions and pixel values.

The present invention demonstrates how modern deep networks can be used to synthesize free viewpoint full-body videos of humans. A neural avatar is built that is controlled by the 3D positions of human joints, can synthesize the image for an arbitrary camera, and trains from a set of unregistered monocular videos (or even a single long video).

Figure 3:
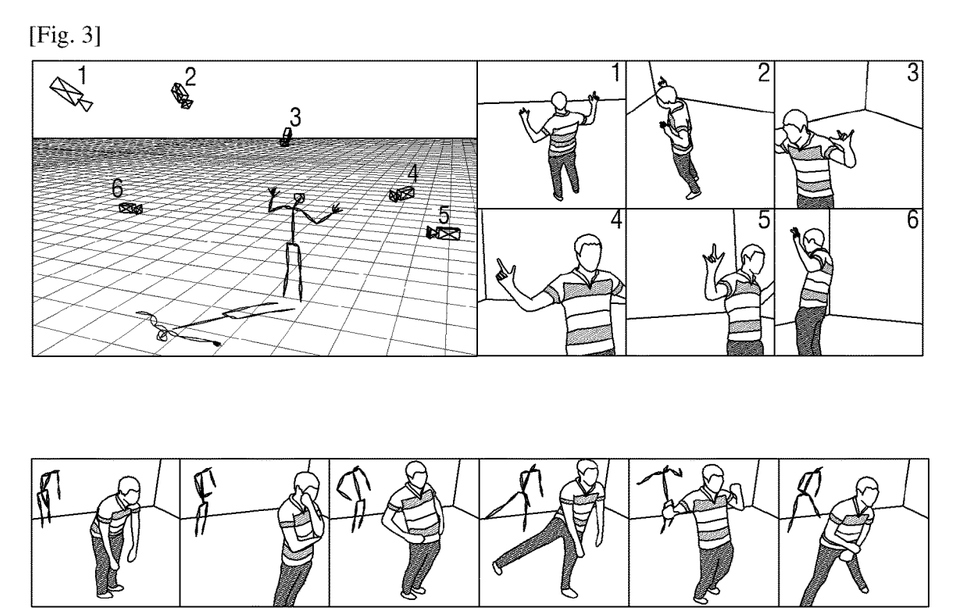
FIG. 3 shows textured neural avatar results for viewpoints unseen during training.

For the purpose of the present invention, a (full-body) avatar is defined as a system that is capable of rendering views of a certain person under varying human pose defined by a set of 3D positions of the body joints and varying camera positions (FIG. 3). FIG. 3 shows textured neural avatar results (without video-to-video post-processing) for different viewpoints during training. Reference numbers 1 to 6 denotes different viewpoints of the camera and images from viewpoints 1 to 6. In lower row of pictures on FIG. 3, the images on the left are obtained by processing the pose input shown on the right. Body joint positions are taken rather than joint angles as an input, since such positions are easier to estimate from data using marker-based or marker-less motion capture systems. A classical ("neural-free") avatar based on a standard computer graphics pipeline is to take a user-personalized body mesh in a neutral position, estimate the joint angles from the joint positions, perform skinning (deformation of the neutral pose) thus estimating the 3D geometry of the body. After that texture mapping is applied using precomputed 2D texture. Finally, the resulting textured model is lit using a certain lighting model and then projected onto the camera view. Creating a person's avatar in the classical pipeline thus requires personalizing the skinning process responsible for the geometry and the texture that is responsible for appearance.

Emerging avatar systems based on the deep networks (neural avatars) attempt to shortcut the multiple stages of the classical pipeline and to replace them with a single network that learns the mapping from the input (the location of body joints) to the output (the 2D image). To simplify the learning task, the input representation can be augmented with additional images such as the results of the classical pipeline in [29, 33] or a dense pose [21] representation in [53]. The abundance of learnable parameters, the ability to learn from long videos, and the flexibility of the deep networks allows neural avatars to model the appearance of parts that are very challenging for a classical pipeline, such as hair, skin, complex clothing and glasses, etc. In addition, the conceptual simplicity of such "black-box" approach is appealing. At the same time, while it is easy to fit the deep networks to training data, the lack of in-built model-specific invariances and the conflation of shape and appearance estimation limits the generalization abilities of such systems. As a result, previous neural rendering approaches are confined to either subpart of the body (up to head-and-shoulders [29]) and/or to a particular camera view [1, 9, 53, 33].

Figure 4:
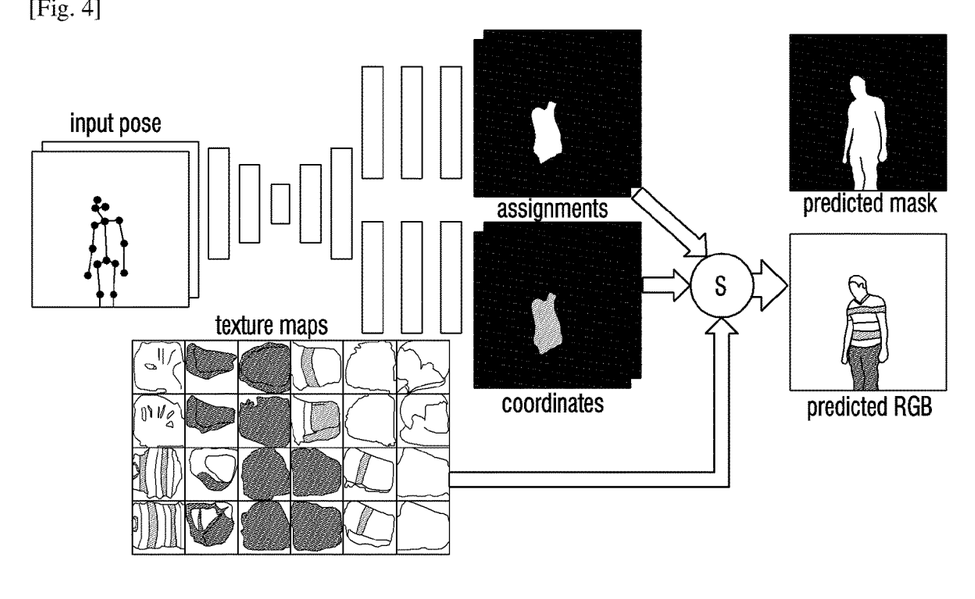
FIG. 4 is the overview of the textured neural avatar system.

The system of the present invention does full body rendering and combines the ideas from the classical computer graphics, namely the decoupling of geometry and texture, with the use of the deep networks. In particular, similarly to the classic pipeline, the system explicitly estimates the 2D textures of body parts. The 2D texture within the classical pipeline effectively transfers the appearance of the body fragments across camera transformations and body articulations. Keeping this component with the neural pipeline thus boosts generalization across such transforms. The role of the deep network in the approach of the present invention is then confined to predicting the texture coordinates of individual pixels given the body pose and the camera parameters (FIG. 4). Additionally, the deep networks predicts the foreground/background mask.

Comparison of the performance of the textured neural avatar provided by the present invention with direct video-to-video translation approach [53] shows that explicit estimation of textures brings additional generalization capability and considerably improves the realism of the generated images for new views. Significant benefits provided by the present invention consist in the fact that the explicit decoupling of textures and geometry gives in the transfer learning scenarios, when the deep network is retrained to a new person with little training data. Finally, the textured neural avatar enjoys considerably faster training time than the direct translation approach.

Methods

Notation. The lower index i is used to denote objects that are specific to the i-th training or test image. Uppercase notation is used, e.g. $B_i$ denotes a stack of maps (a third order tensor/three-dimensional array) corresponding to the i-th training or test image. The upper index is used to denote a specific map (channel) in the stack, e.g. $B^j_i$. Furthermore, square brackets is used to denote elements corresponding to a specific image location, e.g. $B^j_i[x;y]$ denotes the scalar element in the j-th map of the stack $B_i$ located at location (x;y), and $B_i[x;y]$ denotes the vector of elements corresponding to all maps sampled at location (x;y).

Input and output. In general, synthesizing images of a certain person given its pose is required. It is assumed that the pose for the i-th image comes in the form of 3D joint positions defined in the camera coordinate frame. As an input to the deep network, then a map stack $B_i$ is considered, where each map $B^j_i$ contains the rasterized j-th segment (bone) of the "stickman" (skeleton) projected on the camera plane. To retain the information about the third coordinate of the joints, the depth-value is linearly interpolated between the joints defining the segments, and the interpolated values are used to define the values in the map $B^j_i$ corresponding to the bone pixels (the pixels not covered by the j-th bone are set to zero). Overall, the stack $B_i$ incorporates the information about the person and the camera pose.

As an output, the deep network is used to produce an RGB image (a three-channel stack) $I_i$ and a single channel mask $M_i$, defining the pixels that are covered by the avatar. At training time, it is assumed that for each input frame i, the input joint locations and the "ground truth" foreground mask are estimated, and 3D body pose estimation and human semantic segmentation are used to extract them from raw video frames. At test time, given a real or synthetic background image $\hat{I}_i$, the final view is generated by first predicting $M_i$ and $I_i$ from the body pose and then linearly blending the resulting avatar into an image: $\hat{I}_i = \odot M_i \tilde{I}_i \odot (1-M_i)$ (where $\odot$ defines a "location-wise" product, where the RGB values at each location are multiplied by the mask value at this location).

Direct translation. The direct approach that is considered as a baseline to the present invention is to learn the deep network as an image translation network that maps the map stack $B^k_i$ to the map stacks $I_i$ and $M_i$ (usually the two output stacks are produced within two branches that share the initial stage of the processing [15]). Generally, mappings between stacks of maps can be implemented using the deep network, for example, fully-convolutional architectures. Exact architectures and losses for such networks is an active area of research [14, 51, 26, 24, 10]. Very recent works [1, 9, 53, 33] have used direct translation (with various modifications) to synthesize the view of a person for a fixed camera. In particular, the video-to-video system [53] considers the translation network that generates the next frame of the video by taking the inputs for the last three frames, while also considering the output produced by the system for two preceding frames in an auto-regressive fashion. In our case, the video-to-video system [53] is modified to produce the image and the mask:

$$\{I'_i, M'_i\} = h_\Psi^{v2v}(B_i, B_{i-1}, I'_{i-1}, M'_{i-1}, B_{i-2}, I'_{i-2}, M'_{i-2}), \qquad (1)$$

Here, $h_\Psi^{v2v}$ is the video-to-video regression network with learnable parameters $\Psi$. It is also assumed that the training or test examples i−1 and i−2 correspond to the preceding frames. The resulting video-to-video translation system provides a strong baseline for the present invention.

Textured neural avatar. The direct translation approach relies on the generalization ability of the deep networks and incorporates very little domain-specific knowledge into the system. As an alternative, the textured avatar approach is applied, that explicitly estimates the textures of body parts, thus ensuring the similarity of the body surface appearance under varying pose and cameras. Following the DensePose approach [21], the body is subdivided into n parts, where each part has a 2D parameterization. Thus, it is assumed that in a person's image each pixel belongs to one of n parts or to the background. In the former case, the pixel is further associated with 2D part specific coordinates. The k-th body part is also associated with the texture map $T^k$ that is estimated during training. The estimated textures are learned at training time and are reused for all camera views and all poses.

The introduction of the body surface parameterization outlined above changes the translation problem. For a given pose defined by $B_i$, the translation network now has to predict the stack $P_i$ of body part assignments and the stack c of body part coordinates, where $P_i$ contains n+1 maps of non-negative numbers that sum to identity $$\left(\text{i.e. } \overset{n}{\underset{k=1}{Q}} P^k[x, y] = 1\right),$$

and $C_i$ contains 2n maps of real numbers between 0 and w, where w is the spatial size (width and height) of the texture maps $T^k$.

The map channel $P_i^k$ for k=0 . . . n−1 is then interpreted as the probability of the pixel to belong to the k-th body part, and the map channel $P_i^n$ corresponds to the probability of the background. The coordinate maps $C_i^{2k}$ and $C_i^{2k+1}$ correspond to the pixel coordinates on the k-th body part. Specifically, once the part assignments $P_i$ and body part coordinates $C_i$ are predicted, the image $I_i$ at each pixel (x,y) are reconstructed as a weighted combination of texture elements, where the weights and texture coordinates are prescribed by the part assignment maps and the coordinate maps correspondingly:

$$s(P_i, C_i, T)[x, y] = \overset{n-1}{\underset{k=0}{Q}} P_i^k[x, y] \sqsubseteq T^k[C_i^{2k}[x, y], C_i^{2k+1}[x, y]], \qquad (2)$$

where s(•,•,•) is the sampling function (layer) that outputs the RGB map stack given the three input arguments. In (2), the texture maps $T^k$ are sampled at non-integer locations ($C_i^{2k}[x,y]$, $C_i^{2k+1}[x,y]$) in a bilinear way, so that $T^k[x,y]$ is computed as:

$$T^k[x,y] = (1-\alpha)(1-\beta)T^k[*x+, *y+] + (1-\alpha)\beta T^k[*x*+, (y)] + \alpha(1-\beta)T^k[(x), *y+] + \alpha\beta T^{k*}[(x), (y)], \qquad (3)$$

for $\alpha = x - *x+$, $\beta = y - *y+$ as suggested in [25].

When training the neural textured avatar, the deep network $g_\phi$ is learned with learnable parameters $\phi$ to translate the input map stacks $B_i$ into the body part assignments and the body part coordinates. As $g_\phi$ has two branches ("heads"), $g_\phi^P$ is the branch that produces the body part assignments stack, and $g_\phi^C$ is the branch that produces the body part coordinates. To learn the parameters of the textured neural avatar, the loss between the generated image and the ground truth image $\overline{I}_i$ is optimized:

$$L_{image}(\phi,T)=d(\overline{I}_i,s(g_\phi^P(B_i),g_\phi^C(B_i),T), \quad (4)$$

where $d(\cdot,\cdot)$ is a loss comparing two images (the exact choice is discussed below). During the stochastic optimization, the gradient of the loss (4) is backpropagated through (2) both into the translation network $g_\phi$ and onto the texture maps $T^k$, so that minimizing this loss updates not only the network parameters but also the textures themselves. As an addition, the learning also optimizes the mask loss that measures the discrepancy between the ground truth background mask $1-\overline{M}_i$ and the background mask prediction:

$$L_{mask}(\phi,T)=d_{BCE}(\overline{I}-M_i,g_\phi^P(B_i)^n) \quad (5)$$

where $d_{BCE}$ is the binary cross-entropy loss, and $g_\phi^P(B_i)^n$ corresponds to the n-th (i.e. background) channel of the predicted part assignment map stack. After back-propagation of the weighted combination of (4) and (5), the network parameters $\phi$ and the textures maps $T^k$ are updated. As the training progresses, the texture maps change (FIG. 4), and so does the body part coordinate predictions, so that the learning is free to choose the appropriate parameterization of body part surfaces.

FIG. 4 is the overview of the textured neural avatar system. The input pose is defined as a stack of "bone" rasterizations (one bone per channel; here we show it highlighted in red). The input is processed by the fully-convolutional network (orange) to produce body part assignment map stack and the body part coordinate map stack. These stacks are then used to sample the body texture maps at the locations prescribed by the part coordinate stack with the weights prescribed by the part assignment stack to produce the RGB image. In addition, the last body assignment stack map corresponds to the background probability. During learning, the mask and the RGB image are compared with ground-truth and the resulting losses are back-propagated through the sampling operation into the fully-convolutional network and onto the texture, resulting in their updates.

Video-to-video post-processing. While the textured neural avatar model can be used as a standalone neural rendering engine, its output is post-processed with a video-to-video processing module that improves temporal consistency and adds pose- and view-dependent appearance variations that cannot be fully modeled using the textured neural avatar. Thus, the video translation network $h_\psi^{post}$ Post with learnable parameters $\Psi$ is considered that takes the stream of outputs of the textured neural avatar as inputs:

$$\{I'_i,M'_i\}=h_\psi^{post}(B_i,I_i^{TA},B_{i-1},I_{i-1}^{TA},I'_{i-1},M'_{i-1}, \\ B_{i-2},I_{i-2}^{TA}I'_{i-2},M'_{i-2}), \quad (6)$$

Here, we denote with $I_t^{TA}(g_\phi^P(B_i),g_\phi^C(B_i),T)$; the output of the textured neural avatar at time t (It is again assumed that the examples i−1 and i−2 correspond to the preceding frames). Below, our full model, i.e. textured neural avatar with post-processing (6), the textured neural avatars without such post-processing, and the baseline video-to-video model (1) showing the clear improvement from the use of the textured neural avatar (with or without post-processing) are compared.

Initialization of textured neural avatar. The DensePose system [21] is used to initialize the textured neural avatar. Specifically, there are two variants to initialize $g_\phi$. First, when the training data are abundant and come from multiple training monocular sequences, the DensePose can be run on the training images obtaining part assignment maps and part coordinate maps. Then, $g_\phi$, is pretrained as a translation network between the pose stacks $B_i$ and the DensePose outputs. Alternatively, a "uni-versally" pretrained $g_\phi$ can be used that is trained to translate pose stacks into DensePose outputs on a standalone large-scale dataset (we use the COCO dataset [32]).

Once the DensePose mapping has been initialized, the texture maps $T^k$ are initialized as follows. Each pixel in the training images is assigned to a single body part (according to the prediction of $g_\phi^P$) and to a particular texture pixel on the texture of the corresponding part (according to the prediction of $g_\phi^C$). Then, the value of each texture pixel is initialized to the mean of all image values assigned to it (the texture pixels assigned zero pixels are initialized to black).

Losses and architectures. Perceptual (VGG) loss [51, 26] is used in (4) to measure the disparity between the generated and the ground truth image when training the textured neural avatar. Any other standard losses for measuring such disparities can be used.

Transfer learning. Once textured neural avatar is trained for a certain person based on a large amount of data, it can be retrained for a different person using much less data (so-called transfer learning). During retraining a new stack of texture maps is reestimated using the initialization procedure discussed above. After which the training process proceeds in a standard way but using the previously trained set of parameters as initialization.

Figure 5:
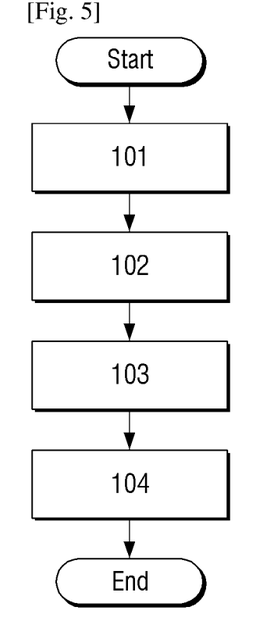
FIG. 5 is a flowchart illustrating one embodiment for the method for synthesizing 2-D image of a person.

One embodiment of the method for synthesizing 2-D image of a person is described in more detail with reference to FIG. 5. The method comprises steps 101, 102, 103, 104.

In the step 101, 3D coordinates of body joint positions of the person defined in the camera coordinate frame are received. The 3D coordinates of the body joint positions define a pose of the person and a viewpoint of the 2-D image to be synthesized.

In the step 102, a trained machine learning predictor predicts a map stack of body part assignments and a map stack of body part coordinates based on received 3D coordinates of the body joint positions. The map stack of body part coordinates defines texture coordinates of pixels of the body parts of the person. The map stack of body part assignments defines weights. In the map stack of body part assignments, each weight indicates a probability of particular pixel to belong to a particular body part of the person.

In the step 103, a map stack of textures for the body parts of the person previously initialized is retrieved from a memory. The map stack of textures comprises values of the pixels of the body parts of the person.

In the step 104, the 2-D image of the person is reconstructed as a weighted combination of the values of the pixels by using the map stack of body part assignments and the map stack of body part coordinates predicted in the step 102 and the map stack of textures retrieved in the step 103.

The machine learning predictor is one of a deep neural network, a deep convolutional neural network, deep fully-convolutional neural network, deep neural network trained with perceptual loss function, a deep neural network trained in an the generative adversarial framework.

Figure 6:
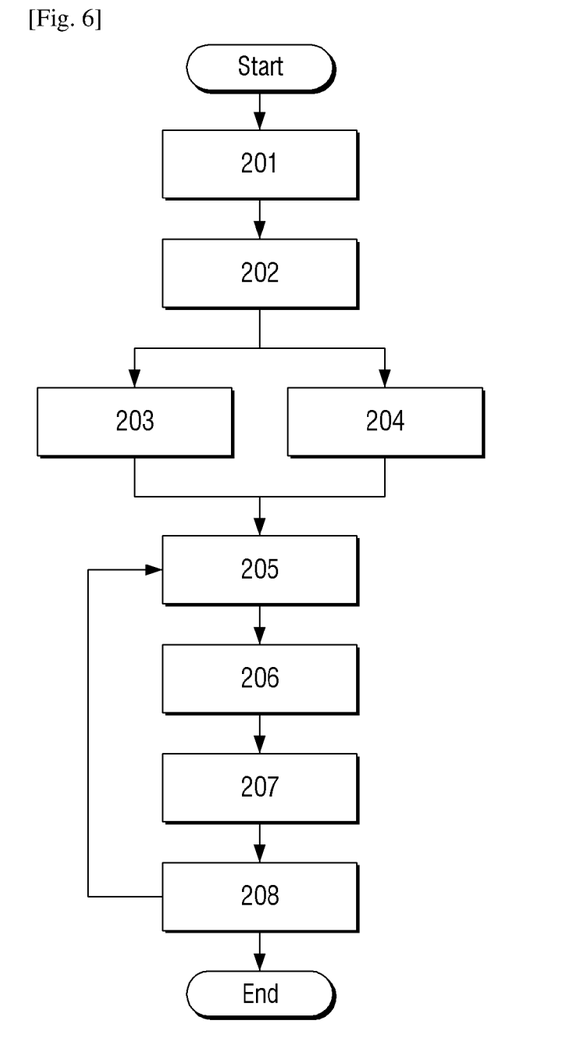
FIG. 6 is a flowchart illustrating a process for obtaining the trained machine learning predictor and the map stack of textures for the body parts of the person.

A process for obtaining the trained machine learning predictor and the map stack of textures for the body parts of the person is described in more detail with reference to FIG. 6. In said process, the method comprises steps 201, 202, 203, 204, 205, 206, 207, 208. The steps 203 and 204 may be performed simultaneously or sequentially in any order.

In the step 201, a plurality of images of the person in different poses and from different viewpoints are received.

In the step 202, the 3D coordinates of body joint positions of the person defined in the camera coordinate frame are obtained for each image of the received plurality of images. The 3D coordinates may be obtained by using any appropriate technique. Such techniques are known in the prior art.

In the step 203, the machine learning predictor is initialized based on the 3D coordinates of the body joint positions and the received plurality of images to obtain parameters for predicting the map stack of body part assignments and the map stack of body part coordinates.

In the step 204, a map stack of textures is initialized based on the 3D coordinates of the body joint positions and the received plurality of images and stored the map stack of the textures in the memory.

In the step 205, the map stack of body part assignments and the map stack of body part coordinates are predicted using the current state of the machine learning predictor based on the 3D coordinates of the body joint positions.

In the step 206, 2-D image of the person is reconstructed as a weighted combination of the values of the pixels by using the map stack of body part assignments, the map stack of body part coordinates and the map stack of textures stored in the memory.

In the step 207, reconstructed 2-D image is compared with a ground truth 2-D image to reveal an error of reconstructing the 2-D image. The ground truth 2-D image corresponds to the reconstructed 2-D image in the pose of the person and the viewpoint. The ground truth 2-D image is chosen from the received plurality of images.

In the step 208, the parameters of the trained machine learning predictor and the values of the pixels in the map stack of textures are updated based on the result of the comparison.

Then, the steps S205 to S208 are repeated to reconstruct different 2-D images of the person until a predetermined condition is met. The predetermined condition may be at least one of performing a predetermined number of repetitions, expiration of a predetermined time or the error of reconstructing the 2-D image of the person does not reduce.

Training the deep networks is well known in the prior art, therefore, detail description of particular steps of the training is omitted.

In another embodiment, the predicting (S102, S205) the map stack of body part assignments and the map stack of body part coordinates may be based on a map stack of rasterized segments. The map stack of rasterized segments is generated based on the 3D coordinates of the body joint positions. Each map of the map stack of rasterized segments comprises a rasterized segment representing a body part of the person.

In yet another embodiment, the trained machine learning predictor may be retrained for other person based on a plurality of images of the other person.

All operations described above may be performed by the system for synthesizing 2-D images of a person. The system for synthesizing 2-D images of a person comprises a processor and a memory. The memory stores instructions causing the processor to implement the method for synthesizing 2-D image of a person.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that embodiments of the system for synthesizing 2-D image of a person can be implemented as different functional units, circuitry and/or processors. However, it will be apparent that any suitable distribution of functionality between different functional units, circuitry and/or processors may be used without detracting from the embodiments.

The embodiments may be implemented in any suitable form including hardware, software, firmware or any combination of these. The embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

The foregoing descriptions of the embodiments of the invention are illustrative, and modifications in configuration and implementation are within the scope of the current description. For instance, while the embodiments of the invention are generally described with relation to FIGS. 3-6, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. Also, the invention is not limited by the illustrated order of the method steps, the order may be modified by a skilled person without creative efforts. Some or all of the method steps may be performed sequentially or concurrently. The scope of the embodiment of the invention is accordingly intended to be limited only by the following claims.

CITATION LIST

[1] K. Aberman, M. Shi, J. Liao, D. Lischinski, B. Chen, and D. Cohen-Or. Deep video-based performance cloning. arXiv preprint arXiv:1808.06847, 2018.

[2] T. Alldieck, M. Magnor, W. Xu, C. Theobalt, and G. Pons-Moll. Detailed human avatars from monocular video. In 2018 International Conference on 3D Vision (3DV), pages 98-109. IEEE, 2018.

[3] T. Alldieck, M. Magnor, W. Xu, C. Theobalt, and G. Pons-Moll. Video based reconstruction of 3d people models. In the IEEE Conference on Computer Vision and Pattern Recognition (CVPR), June 2018.

[4] A. O. B˘alan and M. J. Black. The naked truth: Estimating body shape under clothing. In European Conference on Computer Vision, pages 15-29. Springer, 2008.

[5] F. Bogo, M. J. Black, M. Loper, and J. Romero. Detailed full-body reconstructions of moving people from monocular rgb-d sequences. In Proceedings of the IEEE International Conference on Computer Vision, pages 2300-2308, 2015.

[6] F. Bogo, A. Kanazawa, C. Lassner, P. Gehler, J. Romero, and M. J. Black. Keep it smpl: Automatic estimation of 3d human pose and shape from a single image. In European Conference on Computer Vision, pages 561-578. Springer, 2016.

[7] J. Cao, Y. Hu, H. Zhang, R. He, and Z. Sun. Learning a high fidelity pose invariant model for high-resolution face frontalization. arXiv preprint arXiv:1806.08472, 2018.

[8] D. Casas, M. Volino, J. Collomosse, and A. Hilton. 4d video textures for interactive character appearance. In Computer Graphics Forum, volume 33, pages 371-380. Wiley Online Library, 2014.

[9] C. Chan, S. Ginosar, T. Zhou, and A. A. Efros. Everybody dance now. arXiv preprint arXiv:1808.07371, 2018.

[10] Q. Chen and V. Koltun. Photographic image synthesis with cascaded refinement networks. In IEEE International Conference on Computer Vision, ICCV 2017, Venice, Italy, Oct. 22-29, 2017, pages 1520-1529, 2017.

[11] Y. Choi, M. Choi, M. Kim, J.-W. Ha, S. Kim, and J. Choo. Stargan: Unified generative adversarial networks for multidomain image-to-image translation. In the IEEE Conference on Computer Vision and Pattern Recognition (CVPR), June 2018.

[12] A. Collet, M. Chuang, P. Sweeney, D. Gillett, D. Evseev, D. Calabrese, H.
Hoppe, A. Kirk, and S. Sullivan. Highquality streamable free-viewpoint video. ACM Transactions on Graphics (TOG), 34(4):69, 2015.

[13] C. Donner, T. Weyrich, E. d'Eon, R. Ramamoorthi, and S. Rusinkiewicz. A layered, heterogeneous reflectance model for acquiring and rendering human skin. In ACM Transactions on Graphics (TOG), volume 27, page 140. ACM, 2008.

[14] A. Dosovitskiy and T. Brox. Generating images with perceptual similarity metrics based on deep networks. In Proc. NIPS, pages 658-666, 2016.

[14] A. Dosovitskiy, J. Tobias Springenberg, and T. Brox. Learning to generate chairs with convolutional neural networks. In Proceedings of the IEEE Conference on Computer Vision and Pattern Recognition, pages 1538-1546, 2015.

[16] M. Dou, P. Davidson, S. R. Fanello, S. Khamis, A. Kowdle, C. Rhemann, V. Tankovich, and S. Izadi. Motion2fusion: real-time volumetric performance capture. ACM Transactions on Graphics (TOG), 36(6):246, 2017.

[17] A. Feng, D. Casas, and A. Shapiro. Avatar reshaping and automatic rigging using a deformable model. In Proceedings of the 8th ACM SIGGRAPH Conference on Motion in Games, pages 57-64. ACM, 2015.

[18] Y. Ganin, D. Kononenko, D. Sungatullina, and V. Lempitsky. Deepwarp: Photorealistic image resynthesis for gaze manipulation. In European Conference on Computer Vision, pages 311-326. Springer, 2016.

[19] B. Goldl¨ucke and D. Cremers. Superresolution texture maps for multiview reconstruction. In IEEE 12th International Conference on Computer Vision, ICCV 2009, Kyoto, Japan, Sep. 27-Oct. 4, 2009, pages 1677-1684, 2009.

[20] I. Goodfellow, J. Pouget-Abadie, M. Mirza, B. Xu, D. Warde-Farley, S. Ozair, A. Courville, and Y. Bengio. Gen-erative adversarial nets. In Advances in neural information processing systems, pages 2672-2680, 2014.

[21] R. A. G¨uler, N. Neverova, and I. Kokkinos. Dense-Pose: Dense human pose estimation in the wild. In the IEEE Conference on Computer Vision and Pattern Recognition (CVPR), June 2018.

[22] R. A. G¨uler, G. Trigeorgis, E. Antonakos, P. Snape, S. Zafeiriou, and I. Kokkinos. DenseReg: Fully convolutional dense shape regression in-the-wild. In CVPR, volume 2, page 5, 2017.3

[23] N. Hasler, H. Ackermann, B. Rosenhahn, T. Thormahlen, and H.-P. Seidel. Multilinear pose and body shape estimation of dressed subjects from image sets. In Computer Vision and Pattern Recognition (CVPR), 2010 IEEE Conference on, pages 1823-1830. IEEE, 2010.

[24] P. Isola, J. Zhu, T. Zhou, and A. A. Efros. Image-to-image translation with conditional adversarial networks. In Proc. CVPR, pages 5967-5976, 2017.

[25] M. Jaderberg, K. Simonyan, A. Zisserman, and K. Kavukcuoglu. Spatial transformer networks. In Proc. NIPS, pages 2017-2025, 2015.

[26] J. Johnson, A. Alahi, and L. Fei-Fei. Perceptual losses for real-time style transfer and super-resolution. In Proc. ECCV, pages 694-711, 2016.

[27] A. Kanazawa, M. J. Black, D. W. Jacobs, and J. Malik. End-to-end recovery of human shape and pose. In the IEEE Conference on Computer Vision and Pattern Recognition (CVPR), 2018.

[28] T. Karras, T. Aila, S. Laine, and J. Lehtinen. Progressive growing of GANs for improved quality, stability, and variation. In International Conference on Learning Representations, 2018.

[29] H. Kim, P. Garrido, A. Tewari, W. Xu, J. Thies, M. NieBner, P. P'erez, C. Richardt, M. Zollh¨ofer, and C. Theobalt. Deep video portraits. arXiv preprint arXiv: 1805.11714, 2018.

[30] O. Klehm, F. Rousselle, M. Papas, D. Bradley, C. Hery, B. Bickel, W. Jarosz, and T. Beeler. Recent advances in facial appearance capture. In Computer Graphics Forum, volume 34, pages 709-733. Wiley Online Library, 2015.

[31] V. S. Lempitsky and D. V. Ivanov. Seamless mosaicing of image-based texture maps. In 2007 IEEE Computer Society Conference on Computer Vision and Pattern Recognition (CVPR 2007), 18-23 Jun. 2007, Minneapolis, Minn., USA, 2007.

[32] T.-Y. Lin, M. Maire, S. Belongie, J. Hays, P. Perona, D. Ramanan, P. Doll'ar, and C. L. Zitnick. Microsoft COCO: Common objects in context. In European conference on computer vision, pages 740-755. Springer, 2014.

[33] L. Liu, W. Xu, M. Zollhoefer, H. Kim, F. Bernard, M. Habermann, W. Wang, and C. Theobalt. Neural animation and reenactment of human actor videos. arXiv preprint arXiv:1809.03658, 2018.

[34] S. Lombardi, J. Saragih, T. Simon, and Y. Sheikh. Deep appearance models for face rendering. ACM Transactions on Graphics (TOG), 37(4):68, 2018.

[35] M. Loper, N. Mahmood, J. Romero, G. Pons-Moll, and M. J. Black. Smpl: A skinned multi-person linear model. ACM Transactions on Graphics (TOG), 34(6):248, 2015.

[36] M. Mori. The uncanny valley. Energy, 7(4):33-35, 1970.

[37] F. Mueller, F. Bernard, O. Sotnychenko, D. Mehta, S. Sridhar, D. Casas, and C. Theobalt. Ganerated hands for realtime 3d hand tracking from monocular rgb. In the IEEE Conference on Computer Vision and Pattern Recognition (CVPR), June 2018.

[38] N. Neverova, R. A. Miler, and I. Kokkinos. Dense pose transfer. In the European Conference on Computer Vision (ECCV), September 2018.

[39] G. Pavlakos, L. Zhu, X. Zhou, and K. Daniilidis. Learning to estimate 3d human pose and shape from a single color image. In the IEEE Conference on Computer Vision and Pattern Recognition (CVPR), June 2018.

[40] G. Pons-Moll, J. Romero, N. Mahmood, and M. J. Black. Dyna: A model of dynamic human shape in motion. ACM Transactions on Graphics (TOG), 34(4): 120, 2015.

[41] A. Rav-Acha, P. Kohli, C. Rother, and A. W. Fitzgibbon. Unwrap mosaics: a new representation for video editing. ACM Trans. Graph., 27(3):17:1-17:11, 2008. 3

[42] N. Robertini, D. Casas, E. De Aguiar, and C. Theobalt. Multi-view performance capture of surface details. International Journal of Computer Vision, 124(1):96-113, 2017.

[43] Z. Shu, M. Sahasrabudhe, R. Alp Guler, D. Samaras, N. Paragios, and I. Kokkinos. Deforming autoencoders: Unsupervised disentangling of shape and appearance. In the European Conference on Computer Vision (ECCV), September 2018.

[44] A. Siarohin, E. Sangineto, S. Lathuilire, and N. Sebe. Deformable gans for pose-based human image generation. In the IEEE Conference on Computer Vision and Pattern Recognition (CVPR), June 2018.

[45] J. Starck and A. Hilton. Model-based multiple view reconstruction of people. In IEEE International Conference on Computer Vision (ICCV), pages 915-922, 2003.

[46] I. Stavness, C. A. S'anchez, J. Lloyd, A. Ho, J. Wang, S. Fels, and D. Huang. Unified skinning of rigid and deformable models for anatomical simulations. In SIGGRAPH Asia 2014 Technical Briefs, page 9. ACM, 2014.

[47] D. Sungatullina, E. Zakharov, D. Ulyanov, and V. Lempitsky. Image manipulation with perceptual discriminators. In the European Conference on Computer Vision (ECCV), September 2018.

[48] S. Suwajanakorn, S. M. Seitz, and I. Kemelmacher-Shlizerman. Synthesizing Obama: learning lip sync from audio. ACM Transactions on Graphics (TOG), 36(4):95, 2017.

[49] J. Taylor, J. Shotton, T. Sharp, and A. Fitzgibbon. The Vitruvian manifold: Inferring dense correspondences for one shot human pose estimation. In Computer Vision and Pattern Recognition (CVPR), 2012 IEEE Conference on, pages 103-110. IEEE, 2012. 3

[50] S. Tulyakov, M.-Y. Liu, X. Yang, and J. Kautz. Mocogan: Decomposing motion and content for video generation. In the IEEE Conference on Computer Vision and Pattern Recognition (CVPR), June 2018.

[51] D. Ulyanov, V. Lebedev, A. Vedaldi, and V. S. Lempitsky. Texture networks: Feed-forward synthesis of textures and stylized images. In Proc. ICML, pages 1349-1357, 2016.

[52] M. Volino, D. Casas, J. P. Collomosse, and A. Hilton. Optimal representation of multi-view video. In Proc. BMVC, 2014.

[53] T.-C. Wang, M.-Y. Liu, J.-Y. Zhu, G. Liu, A. Tao, J. Kautz, and B. Catanzaro. Video-to-video synthesis. arXiv preprint arXiv:1808.06601, 2018.

[54] L. Wei, L. Hu, V. Kim, E. Yumer, and H. Li. Real-time hair rendering using se-quential adversarial networks. In the European Conference on Computer Vision (ECCV), September 2018.

[55] A. Weiss, D. Hirshberg, and M. J. Black. Home 3d body scans from noisy image and range data. In Computer Vision (ICCV), 2011 IEEE International Conference on, pages 1951-1958. IEEE, 2011.

[56] T. Weyrich, W. Matusik, H. Pfister, B. Bickel, C. Donner, C. Tu, J. McAndless, J. Lee, A. Ngan, H. W. Jensen, et al. Analysis of human faces using a measurement-based skin reflectance model. In ACM Transactions on Graphics (TOG), volume 25, pages 1013-1024. ACM, 2006.

[57] O. Wiles, A. Sophia Koepke, and A. Zisserman. X2face: A network for con-trolling face generation using images, audio, and pose codes. In the European Conference on Computer Vision (ECCV), September 2018.

[58] E. Wood, T. Baltrusaitis, X. Zhang, Y. Sugano, P. Robinson, and A. Bulling. Rendering of eyes for eye-shape registration and gaze estimation. In Proceedings of the IEEE International Conference on Computer Vision, pages 3756-3764, 2015.

[59] F. Xu, Y. Liu, C. Stoll, J. Tompkin, G. Bharaj, Q. Dai, H.-P. Seidel, J. Kautz, and C. Theobalt. Video-based characters: creating new human performances from a multi-view video database. ACM Transactions on Graphics (TOG), 30(4):32, 2011.

INDUSTRIAL APPLICABILITY

Sequence Listing Free Text

The invention claimed is:

1. A method for synthesizing 2-D image of a person, the method comprising:
 receiving (S101) 3D coordinates of body joint positions of the person defined in a camera coordinate frame, wherein the 3D coordinates of the body joint positions define a pose of the person and a viewpoint of the 2-D image;
 predicting (S102), using a trained machine learning predictor, a map stack of body part assignments and a map stack of body part coordinates based on the 3D coordinates of the body joint positions, wherein the map stack of body part coordinates defines texture coordinates of pixels of the body parts of the person, the map stack of body part assignments defines weights, each weight indicating a probability of particular pixel to belong to a particular body part of the person;
 retrieving (S103), from a memory, a map stack of textures for the body parts of the person previously initialized, wherein the map stack of textures comprises values of the pixels of the body parts of the person; and
 reconstructing (S104) the 2-D image of the person as a weighted combination of the values of the pixels by using the map stack of body part assignments, the map stack of body part coordinates and the map stack of textures.

2. The method according to claim 1, wherein obtaining the trained machine learning predictor and the map stack of textures for the body parts of the person previously initialized comprises:
 receiving (S201) a plurality of images of the person in different poses and from different viewpoints;
 obtaining (S202) the 3D coordinates of body joint positions of the person defined in the camera coordinate frame for each image of the received plurality of images;
 initializing (S203) the machine learning predictor based on the 3D coordinates of the body joint positions and the received plurality of images to obtain parameters for predicting the map stack of body part assignments and the map stack of body part coordinates;
 initializing (S204) the map stack of textures based on the 3D coordinates of the body joint positions and the received plurality of images and storing, in the memory, the map stack of the textures;
 predicting (S205), using the current state of the machine learning predictor, the map stack of body part assignments and the map stack of body part coordinates based on the 3D coordinates of the body joint positions;
 reconstructing (S206) 2-D image of the person as a weighted combination of the values of the pixels by using the map stack of body part assignments, the map stack of body part coordinates and the map stack of textures stored in the memory;

comparing (S207) reconstructed 2-D image with corresponding ground truth 2-D image from within the received plurality of images to reveal an error of reconstructing the 2-D image;

updating (S208) the parameters of the trained machine learning predictor and the values of the pixels in the map stack of textures based on the result of the comparison; and repeating steps S205 to S208 for reconstructing different 2-D images of the person until a predetermined condition is met, wherein the predetermined condition is at least one of performing a predetermined number of repetitions, expiration of a predetermined time or the error of reconstructing the 2-D image of the person does not reduce.

3. The method according to claim 1, wherein the machine learning predictor is one of a deep neural network, a deep convolutional neural network, a deep fully-convolutional neural network, a deep neural network trained with a perceptual loss function, and a deep neural network trained in an generative adversarial framework.

4. The method according to claim 1, further comprising:
generating a map stack of rasterized segments based on the 3D coordinates of the body joint positions, wherein each map of the map stack of rasterized segments comprises a rasterized segment representing the body part of the person, wherein the map stack of body part assignments and the map stack of body part coordinates is predicted based on the map stack of rasterized segments.

5. The method according to claim 2, wherein the trained machine learning predictor is retrained for another person based on a plurality of images of another person.

6. A system for synthesizing 2-D image of a person, the system comprising:
a processor; and
a memory comprising instructions causing the processor to:
receive (S101) 3D coordinates of body joint positions of the person defined in a camera coordinate frame, wherein the 3D coordinates of the body joint positions define a pose of the person and a viewpoint of the 2-D image;

predict (S102), using a trained machine learning predictor, a map stack of body part assignments and a map stack of body part coordinates based on the 3D coordinates of the body joint positions, wherein the map stack of body part coordinates defines texture coordinates of pixels of the body parts of the person, the map stack of body part assignments defines weights, each weight indicating a probability of particular pixel to belong to a particular body part of the person;

retrieve (S103), from a memory, a map stack of textures for the body parts of the person previously initialized, wherein the map stack of textures comprises values of the pixels of the body parts of the person; and reconstruct (S104) the 2-D image of the person as a weighted combination of the values of the pixels by using the map stack of body part assignments, the map stack of body part coordinates and the map stack of textures.

7. The method according to claim 2, wherein the machine learning predictor is one of a deep neural network, a deep convolutional neural network, a deep fully-convolutional neural network, a deep neural network trained with a perceptual loss function, and a deep neural network trained in an generative adversarial framework.

8. The method according to claim 2, further comprising:
generating a map stack of rasterized segments based on the 3D coordinates of the body joint positions, wherein each map of the map stack of rasterized segments comprises a rasterized segment representing the body part of the person, wherein the map stack of body part assignments and the map stack of body part coordinates is predicted based on the map stack of rasterized segments.

9. The system according to claim 6, wherein, to obtain the trained machine learning predictor and the map stack of textures for the body parts of the person previously initialized, the memory further comprises instructions causing the processor to:
receive (S201) a plurality of images of the person in different poses and from different viewpoints;

obtain (S202) the 3D coordinates of body joint positions of the person defined in the camera coordinate frame for each image of the received plurality of images;

initialize (S203) the machine learning predictor based on the 3D coordinates of the body joint positions and the received plurality of images to obtain parameters for predicting the map stack of body part assignments and the map stack of body part coordinates;

initialize (S204) the map stack of textures based on the 3D coordinates of the body joint positions and the received plurality of images and storing, in the memory, the map stack of the textures;

predict (S205), using the current state of the machine learning predictor, the map stack of body part assignments and the map stack of body part coordinates based on the 3D coordinates of the body joint positions;

reconstruct (S206) 2-D image of the person as a weighted combination of the values of the pixels by using the map stack of body part assignments, the map stack of body part coordinates and the map stack of textures stored in the memory;

compare (S207) reconstructed 2-D image with corresponding ground truth 2-D image from within the received plurality of images to reveal an error of reconstructing the 2-D image;

update (S208) the parameters of the trained machine learning predictor and the values of the pixels in the map stack of textures based on the result of the comparison; and repeat steps S205 to S208 for reconstructing different 2-D images of the person until a predetermined condition is met, wherein the predetermined condition is at least one of performing a predetermined number of repetitions, expiration of a predetermined time or the error of reconstructing the 2-D image of the person does not reduce.

10. The system according to claim 6, wherein the machine learning predictor is one of a deep neural network, a deep convolutional neural network, a deep fully-convolutional neural network, a deep neural network trained with a perceptual loss function, and a deep neural network trained in an generative adversarial framework.

11. The system according to claim 6, wherein the memory further comprises instructions causing the processor to:
generate a map stack of rasterized segments based on the 3D coordinates of the body joint positions, wherein each map of the map stack of rasterized segments comprises a rasterized segment representing the body part of the person, wherein the map stack of body part assignments and the map stack of body part coordinates is predicted based on the map stack of rasterized segments.

12. The system according to claim 9, wherein the machine learning predictor is one of a deep neural network, a deep convolutional neural network, a deep fully-convolutional neural network, a deep neural network trained with a perceptual loss function, and a deep neural network trained in an generative adversarial framework.

13. The system according to claim 9, wherein the memory further comprises instructions causing the processor to:
generate a map stack of rasterized segments based on the 3D coordinates of the body joint positions, wherein each map of the map stack of rasterized segments comprises a rasterized segment representing the body part of the person,
wherein the map stack of body part assignments and the map stack of body part coordinates is predicted based on the map stack of rasterized segments.

\* \* \* \* \*